United States Patent Office 2,993,941
Patented July 25, 1961

2,993,941
MANUFACTURE OF HIGH MOLECULAR WEIGHT OLEFINS
Paul F. Warner, Phillips, Tex., assignor to Phillips Petroleum Company, a corporation of Delaware
No Drawing. Filed Nov. 17, 1958, Ser. No. 774,080
2 Claims. (Cl. 260—683.15)

This invention relates to the manufacture of high molecular weight olefins. In particular, the invention relates to a method for the reaction of certain low molecular weight olefins with branched chain high molecular weight olefins to produce higher molecular weight olefins.

There has existed for a number of years a rather large market for high molecular weight olefins boiling in the range from about 400 to 500° F. for various industrial purposes, for instance, for the preparation of high molecular weight tertiary mercaptans employed in the manufacture of synthetic rubbers. Although a considerable quantity of such olefins are available from various sources, notably from polymerization of low molecular weight olefins, the method of production of such olefins usually results in a mixture of olefins containing predominantly olefins boiling lower than 400 to 500° F.

It is therefore an object of the present invention to provide a process for converting branched chain aliphatic olefins containing from 10 to 12 carbon atoms and boiling in the range from about 340 to about 400° F. to branched chain olefins containing more carbon atoms than the starting material and boiling in the range from about 400 to about 500° F. Other objects, as well as aspects and advantages, of the invention will become apparent from a consideration of the accompanying disclosure.

According to the present invention there is provided a process which comprises the catalytic reaction of a branched chain olefin containing 10 to 12 carbon atoms and boiling in the range from about 340 to about 400° F. to a higher molecular weight branched chain olefin boiling in the range from 400 to 500° F. by contacting said olefin with a low molecular weight olefin selected from the group consisting of propylene and isobutylene in the presence of a natural or synthetic silica-alumina catalyst.

The olefin starting material can be a single aliphatic branched chain olefin species, or it can be a mixture of $C_{10}$ to $C_{12}$ olefins of that description.

The silica-alumina catalyst employed in the present process can be a natural clay catalyst or a synthetic silica-alumina, and it contains preferably more silica by weight than alumina. As specific examples of catalyst there can be mentioned synthetic silica-alumina gel catalyst containing 10, 20, 30 and 40 weight percent alumina, and among the naturally occurring clays there can be mentioned, for instance, montmorillonite clays, Silverton clay, etc. As will be understood, the natural clays are ordinarily activated before use as a catalyst.

The temperature of the reaction is important in the process in order to obtain the desired products and the temperatures employed are within the range from about 90° F. to 300° F., preferably from 120 to 220° F. In the case of the reaction with isobutylene as the low molecular weight olefin an even more preferred temperature range is from about 125 to 140° F. In the case of the reaction of propylene as the low molecular weight olefin, a still preferred range is from about 150 to about 220° F.

The ratio of low molecular weight olefin to high molecular weight olefin usually lies within the range of from 0.2 to 3 mols of low molecular weight olefin per mol of high molecular weight olefin, preferably in the range from about 0.25 to 2.

Although not considered critical, the space velocity employed in the present process is usually in the range from 0.3 to 5 volumes per volume of catalyst per hour.

I have found that the catalytic reaction of the propylene or isobutylene with the branched chain aliphatic olefins of high molecular weight when carried out at the relatively low polymerization temperatures of the present invention results in good yields of the desired higher molecular weight olefins boiling in the range from 400 to 500° F. As will be illustrated in the following examples, most, and in the preferred temperatures ranges usually all, of the effluent from the reaction which is not in the desired boiling range of 400 to 500° F. is in the desired boiling range for the starting material and can be recycled to extinction to give high ultimate yields of the desired products.

The following examples illustrate the invention.

EXAMPLE I

A mixture of $C_{10}$ to $C_{12}$ olefins boiling in the range indicated in Table I was reacted with isobutylene under the conditions indicated in the various runs shown in Table I. The catalyst employed was a montmorillonite clay catalyst activated by heating in air at 425° F. for six hours before use. At the end of each run the reactor effluents were weathered to eliminate any unreacted low molecular weight olefin before the ASTM distillations were run.

*Table I*

REACTION OF ISOBUTYLENE WITH HIGH MOLECULAR WEIGHT OLEFINS

| Run No. | | 1 | 2 | 3 | 4 | 5 | 6 |
|---|---|---|---|---|---|---|---|
| Synthesis Temp., ° F | Charge | 80 | 122 | 132 | 145 | 177 | 200 |
| Pressure, p.s.i.g | | 800 | 800 | 800 | 800 | 800 | 800 |
| Mole Ratio, $C_4/C_{10}$-$C_{12}$ | | 1/3.25 | 1/3.25 | 1/3.25 | 1/3.25 | 1/3.25 | 1/3.25 |
| Space Velocity | | 1.5 | 1.5 | 1.5 | 1.5 | 1.5 | 1.5 |
| Distillation of Effluent, ASTM D-86, ° F. at 760: | | | | | | | |
| IBP | 344 | 154 | 146 | 140 | 216 | 306 | 311 |
| 5 | 353 | 346 | 337 | 340 | 346 | 339 | 340 |
| 10 | 356 | 352 | 349 | 349 | 352 | 349 | 350 |
| 20 | 358 | 362 | 358 | 358 | 359 | 359 | 360 |
| 30 | 360 | 364 | 362 | 362 | 364 | 366 | 366 |
| 40 | 362 | 366 | 365 | 366 | 368 | 370 | 369 |
| 50 | 364 | 369 | 369 | 369 | 373 | 374 | 374 |
| 60 | 367 | 372 | 372 | 374 | 380 | 379 | 379 |
| 70 | 370 | 375 | 376 | 378 | 387 | 385 | 386 |
| 80 | 374 | 381 | 382 | 386 | 398 | 396 | 401 |
| 90 | 380 | 400 | 398 | 407 | 445 | 440 | (²) |
| 95 | 386 | (¹) | (¹) | (¹) | 573 | 471 | |
| DP | 393 | | | | (¹) | (¹) | |
| EP | 401 | 420 | 436 | 478 | 583 | 574 | |

¹ Product distilling over so smoky thermometer could not be read.
² Flask broke.

EXAMPLE II

Example I was repeated except that the isobutylene was replaced with propylene and the conditions were as shown in Table II. The results are shown in Table II.

*Table II*

REACTION OF PROPYLENE WITH HIGH MOLECULAR WEIGHT OLEFINS

| Run No. | | 1 | 2 | 3 | 4 | 5 |
|---|---|---|---|---|---|---|
| Synthesis Temp., °F | Charge | 85 | 140 | 195 | 250 | 295 |
| Pressure, p.s.i.g. | | 800 | 800 | 800 | 800 | 800 |
| Mole Ratio $C_3/C_{10}$-$C_{12}$ | | 1/1 | 1/1 | 1/1 | 1/1 | 1/1 |
| Space Velocity | | 1.5 | 1.5 | 1.5 | 1.5 | 1.5 |
| Distillation of Effluent, ASTM D-86, °F. at 760: | | | | | | |
| IBP | 344 | 342 | 346 | 343 | 288 | 294 |
| 5 | 353 | 352 | 356 | 355 | 346 | 342 |
| 10 | 356 | 357 | 359 | 358 | 356 | 353 |
| 20 | 358 | 360 | 361 | 361 | 361 | 364 |
| 30 | 360 | 363 | 363 | 364 | 367 | 369 |
| 40 | 362 | 367 | 365 | 367 | 372 | 373 |
| 50 | 364 | 369 | 368 | 370 | 376 | 377 |
| 60 | 367 | 373 | 371 | 373 | 380 | 383 |
| 70 | 370 | 376 | 375 | 377 | 385 | 391 |
| 80 | 374 | 381 | 379 | 384 | 399 | 405 |
| 90 | 380 | 393 | 389 | 405 | 443 | 498 |
| 95 | 386 | 439 | 421 | 468 | | 541 |
| DP | 393 | | | | | |
| EP | 401 | 439 | 425 | 505 | 584 | 559 |

As will be evident to those skilled in the art, various modifications of this invention can be made or followed in the light of the foregoing disclosure and discussion without departing from the spirit and scope of the disclosure or from the scope of the claims.

I claim:

1. A process for converting a first branched chain aliphatic olefin containing 10–12 carbon atoms and boiling in the range from 340 to 400° F. to a second branched chain aliphatic olefin containing more carbon atoms than said first olefin and boiling in a range from 400 to 500° F., which comprises contacting said first olefin in the presence of a catalyst consisting essentially of silica-alumina in a reaction zone with propylene in the ratio of 0.25 to 2 mols of propylene per mol of said first olefin, said catalyst containing more silica than alumina, and maintaining a temperature in said reaction zone in the range of 150 to 220° F.

2. A process for converting a first branched chain aliphatic olefin containing 10–12 carbon atoms and boiling in the range from 340 to 400° F. to a second branched chain aliphatic olefin containing more carbon atoms than said first olefin and boiling in a range from 400 to 500° F., which comprises contacting said first olefin in the presence of a catalyst consisting essentially of silica-alumina in a reaction zone with isobutylene in the ratio of 0.25 to 2 mols of isobutylene per mol of said first olefin, said catalyst containing more silica than alumina, and maintaining a temperature in said reaction zone in the range of 125 to 140° F.

References Cited in the file of this patent

UNITED STATES PATENTS

| 1,993,513 | Ipatieff | Mar. 5, 1935 |
| 2,377,411 | Frey | June 5, 1945 |
| 2,695,326 | Lippincott et al. | Nov. 23, 1954 |
| 2,843,641 | Langlois et al. | July 15, 1958 |
| 2,881,233 | Clark | Apr. 7, 1959 |